Sept. 3, 1968
R. J. O'NEILL
3,399,778
FILTER APPARATUS HAVING TUBULAR FILTER MEDIUM
Filed Aug. 10, 1966
2 Sheets-Sheet 1
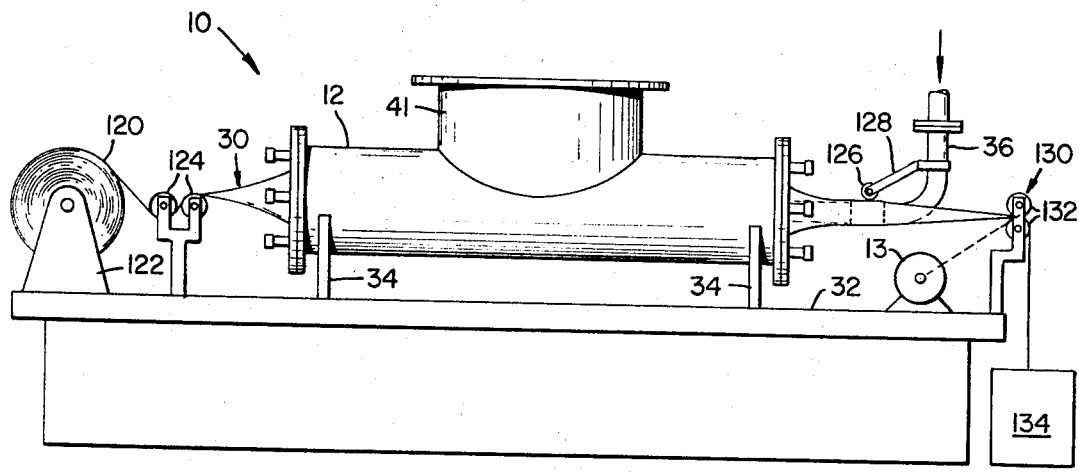
FIG_1
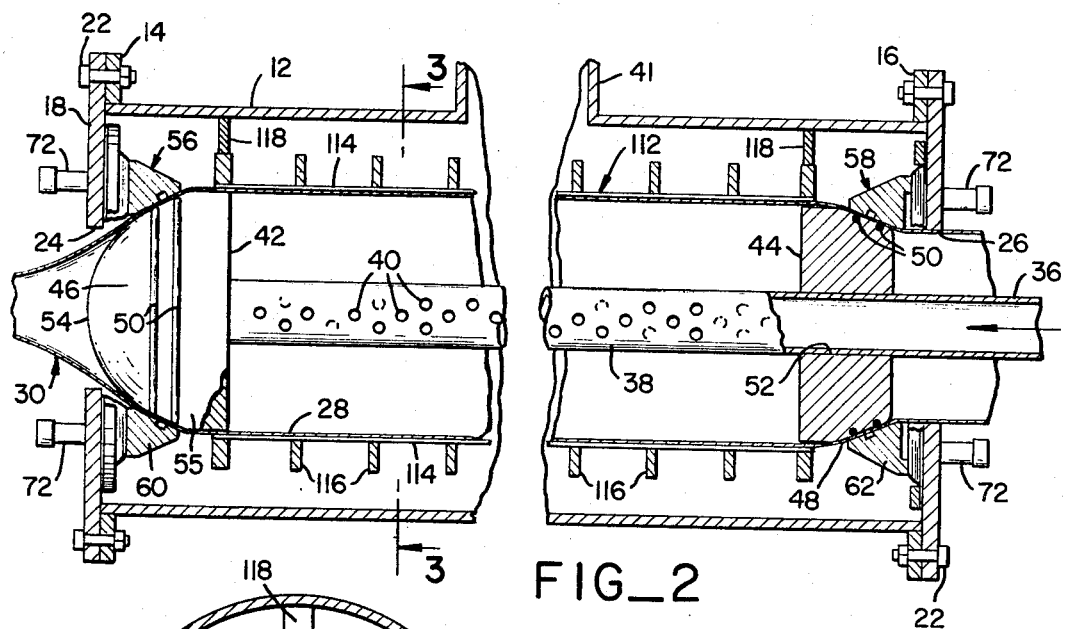
FIG_2
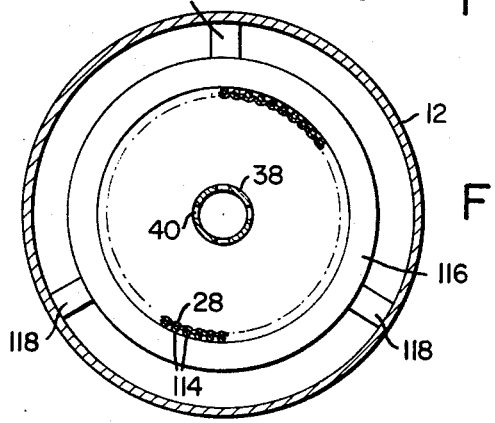
FIG_3
INVENTOR.
RAYMOND J. O'NEILL
BY
Townsend & Townsend
ATTORNEYS

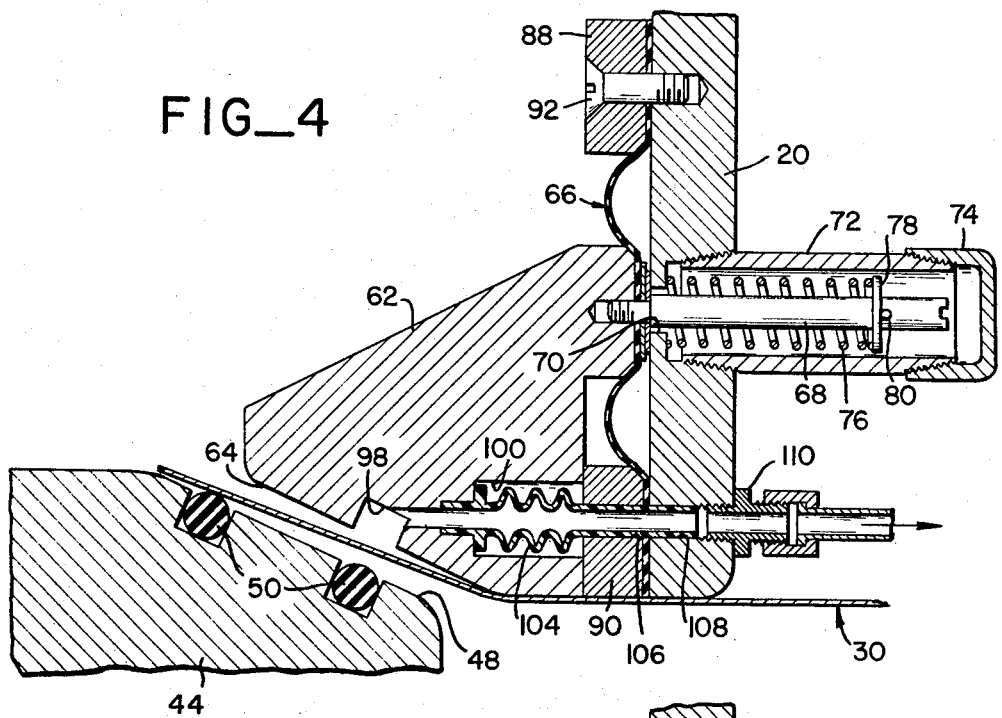
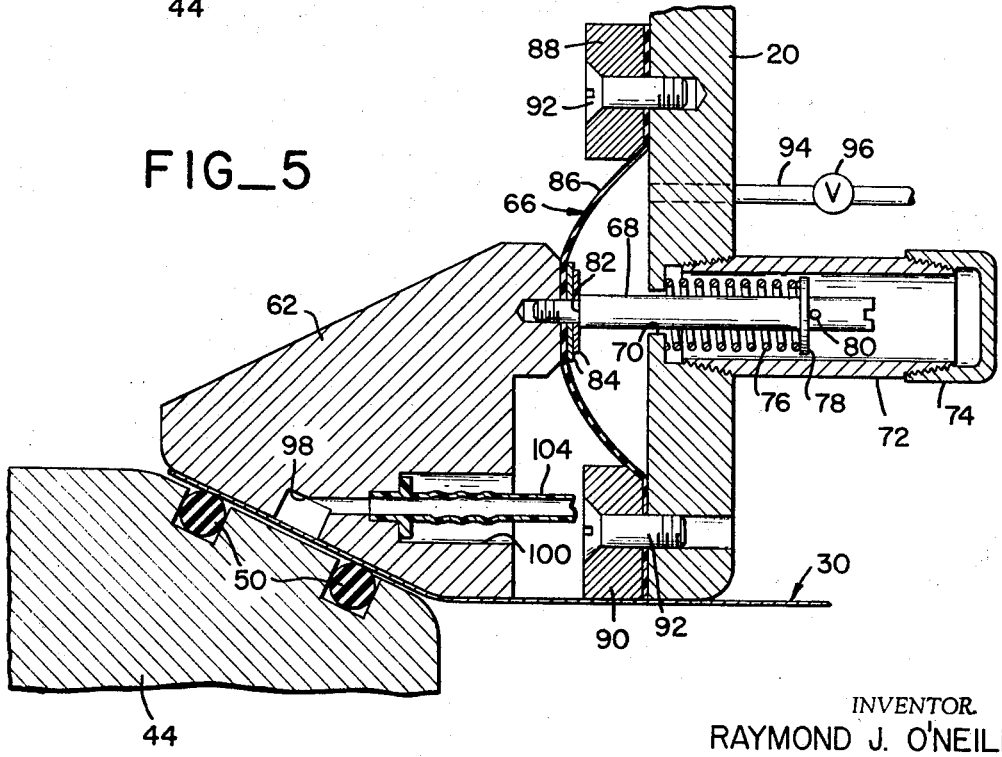

United States Patent Office 3,399,778
Patented Sept. 3, 1968

3,399,778
FILTER APPARATUS HAVING TUBULAR FILTER MEDIUM
Raymond J. O'Neill, Berkeley, Calif., assignor to De Laval Turbine Inc., Millbrae, Calif.
Filed Aug. 10, 1966, Ser. No. 571,452
12 Claims. (Cl. 210—387)

ABSTRACT OF THE DISCLOSURE

An improved filter unit utilizing a tubular filter member and means for removably closing the opposed ends of a stretch of the filter member when the stretch is across a fluid flow path defined by a pair of fluid conduits. One of the conduits extends into the filter member and has structure forming a part of the closing means. Means is also provided to advance the filter member relative to the fluid flow path to allow a clean stretch thereof to be moved into place across the path.

---

This invention relates to improvements in filter apparatus and, more particularly, to a filter assembly utilizing a tubular filter medium.

The present invention provides an improved filter unit by utilizing a tubular filter member and means for removably placing a longitudinal stretch of the filter member across a path of flow of a fluid under pressure. When the stretch is in place, both of its ends are closed so that the fluid flow is through its continuous side wall. This is accomplished by the use of a pair of fluid conduits, one conduit communicating interiorly of the stretch and the other conduit being disposed exteriorly thereof but communicating with a housing surroundng the stretch and forming a part of the filter unit.

The inner conduit has bearing structure coupled thereto so that, to close the ends of the stretch, annular segments at these ends are forced against such bearing structure by shiftable devices carried by the housing and selectively actuated remotely thereof. When these shiftable devices are retracted, however, the stretch can move relative to the housing since its end will then be effectively out of forced engagement with the bearing structure. This latter feature thus allows the stretch to be replaced and, by providing the housing with opposed, open ends, the stretch can form one of a series of interconnected lengths of filter material made in the form of a tube. This will permit the lengths of filter material to be successively used as replaceable filters in the housing. A supply of such filter material can be placed adjacent to the inlet end of the housing and thereby made readily available for this purpose.

In fluid flow systems which require fluid filtering, the filtering action is generally accomplished by filter units employing sheet filters positioned across the fluid flow path. This type of unit has permitted the use of traveling cloth filters wherein interconnected lengths of sheet filter material can be successively used after the preceding lengths have become unsuitable for further use by virtue of the impurities collected thereon. These filter units also are capable of filtering the fluid while the same is under pressure but they cannot be licensed and labeled under governmental safety codes if the operating fluid pressures are greater than one atmosphere. No state code presently exists which will allow any flat surface pressure vessel to be used above this pressure level.

In high pressure fluid flow systems, it is oftentimes desired that the filtering action take place without reducing the fluid pressure. With the use of sheet filters, this is not possible since the fluid pressure must be reduced below the one atmosphere level to be filtered with existing filtering units. A need has therefore arisen for a pressure vessel which will conform to the requirements set forth in state codes and which will permit fluid filtering action without reducing fluid pressure to the aforesaid level. The present invention, according to one of its embodiments, provides a filter assembly constructed to satisfy these requirements and, to this end, includes a cylindrical housing through which interconnected lengths of filter material can be successively moved, each length providing the filter within the housing for so long a time as impurities collected thereby will not adversely affect fluid flow through the housing. It is the cylindrical configuration of the housing which permits the present invention to conform to state codes. To utilize a cylindrical housing, however, it is necessary to employ a tubular filter to avoid the limitations imposed by a flat sheet filter.

A number of advantages accrue from the use of a tubular filter in this manner. One of these advantages is that the fluid inlet of the housing can be placed within the filter member itself so that the impurities collected thereby will be on the inner surface and thereby be completely removed from the housing when the filter member is replaced by the succeeding stretch. Another advantage is the fact that an available supply of the filter material can be provided adjacent to and exteriorly of the inlet end of the housing. While the filter supply can take various forms, it is practical to place it in roll form since filter material generally is flexible and can be readily wound and unwound from a roll.

Another advantage which results from the use of this construction is the fact that annular segments of each stretch of filter material can be effectively sealed by the use of rigid rings coupled to inflatable structure at respective ends of the housing. By inflating the last mentioned structure, the rings can be used to force the annular segments against bearing surfaces within the tubular member and coupled with the inner conduit. In this way, not only will the ends of the filter member be closed, but also the ends of the housing will be closed. The housing will therefore define a pressure vessel directly connected to the high pressure fluid flow line of a fluid system, notwithstanding the fact that the filter member can be moved out of the housing and replaced by the succeeding member when the inflatable structures are deflated.

The above construction also permits the controlled actuation of feed means coupled with the filter material to intermittently advance successive stretches of the filter material into the operative position within the housing. The present invention therefore provides the advantages of both automatic filter replacement and a standby filter supply.

It is therefore the primary object of this invention to provide a filter apparatus having a tubular filter medium within the housing provided with a pair of open ends wherein both the housing and the filter member can be placed across a fluid flow line to permit the same to form an integral part of a fluid flow system.

A further object of this invention is the provision of filter apparatus constructed to meet the requirements for high pressure operation set forth by governmental codes, whereby the apparatus can be used in a high pressure fluid flow system for filtering the fluid thereof without the operating pressure thereof.

Another object of this invention is to provide a high pressure filter unit having a tubular filter member whose ends are alternately forced into and out of sealing engagement with a pair of bearing members mounted on the fluid inlet conduit within the filter member itself, so that these ends are closed and the continuous side wall of the filter member not only provides the filtering action but traps therewithin the impurities removed from the fluid by such filtering action.

In the drawings:

FIG. 1 is a side elevational view of a preferred embodiment of the filter apparatus;

FIG. 2 is an enlarged, fragmentary, vertical section through the apparatus showing one stretch of a tubular filter medium in an operative position within a cylindrical housing;

FIG. 3 is a cross sectional view taken along line 3—3 of FIG. 2;

FIG. 4 is an enlarged, vertical section through a portion of the apparatus illustrating the structure for closing one end of the stretch when the filter medium is free to move relative to the structure; and FIG. 5 is a view similar to FIG. 4 but illustrating the way in which the end of the stretch is closed.

A preferred embodiment of the filter apparatus is denoted by the numeral 10 and includes a cylindrical housing 12 having end flanges 14 and 16 to which plates 18 and 20 are removably coupled by fasteners 22 as shown in FIG. 2. End plates 18 and 20 have a central apertures 24 and 26 respectively through which an operative stretch or portion 28 of a tubular filter member or medium 30 extends. Housing 12 is mounted in any desired position but, for purposes of illustration, is disposed on a supporting surface 32 by legs 34 so that the longitudinal axis of the housing is substantially horizontal. However, this axis could be vertical or inclined if desired.

A fluid inlet conduit 36, secured in any suitable manner to supporting structure (not shown), has a section 38 extending into housing 12 through aperture 26 (FIG. 2). Section 38 also extends into stretch 28 through the proximal extremity and has a number of openings 40 therethrough so that conduit 36 is in fluid communication with the interior of stretch 28.

A fluid outlet conduit 41 is secured to and extends outwardly from housing 12 intermediate the ends of the latter. Conduit 41 communicates with housing 12 exteriorly of stretch 28 (FIG. 2).

A pair of bearing members 42 and 44, secured to section 38 and disposed adjacent to end plates 18 and 20 respectively, have annular, grooved outer bearing surfaces 46 and 48 respectively. Each of surfaces 46 and 38 is provided with O-ring seals 50 in the grooves thereof. Member 44 has a central opening 52 through which section 38 extends. The outermost end of bearing member 42 is dome-shaped at end 54 to allow for the opening or distending of filter medium 30 as it moves into housing 12. Medium 30, as will hereinafter be set forth, is flexible and wound in a flattened condition on a roll adjacent to housing 12. Thus, end 54 assures that stretch 28 will be opened and bearing members 42 and 44 assure that it will remain open or distended as shown in FIG. 2.

Bearing members 42 and 44 form parts of a pair of fluid seals 56 and 58 adjacent to end plates 18 and 20 respectively. Seals 56 and 58 are substantially identical in construction and they employ rigid rings 60 and 62 to force proximal angular segments of stretch 28 against surfaces 46 and 48. This action closes the ends of stretch 28 with the latter surrounding section 38.

To illustrate the sealing action of seals 56 and 58, seal 58 is illustrated in FIGS. 4 and 5. Ring 62 has a bevelled bearing surface 64 which is movable into and out of engagement with the outer surface of filter medium 30. The movement of this ring is effected as an inflatable device 66 is alternately inflated and deflated. Ring 62 thus forces the adjacent filter material into sealing relationship with O-rings 50 as shown in FIG. 5 when member 66 is inflated and permits such material to move out of sealing relationship when member 66 is deflated as shown in FIG. 4.

Ring 62 is mounted for reciprocation on housing 12 by a number of pins 68 which extend through holes 70 in end plate 20. A number of sleeves 72 are threadably coupled to end plate 20 and extend outwardly from respective holes 70. A cap 74 closes the outer end of each sleeve 72 respectively.

A coil spring 76 surrounding each pin 68 respectively biases the latter outwardly of housing 12 by virtue of being in engagement with a ring 78 surrounding pin 68 and engaging a detent 80. In the configuration shown in FIG. 4, spring 76 is under compression so that ring 62 is, at all times, biased toward plate 20. Each pin 68 is threadably coupled to ring 62 and has a shoulder 82 for retaining annular gaskets 84 in place, gaskets 84 forcing an annular portion of a flexible sheet 86 against ring 62. Sheet 86 defines inflatable member 66 and is secured to the inner surface of end plate 20 by concentric rings 88 and 90, the latter being secured to the end plate by fasteners 92.

A conduit 94 extends through and outwardly of plate 20 and communicates with the interior of device 66 so that a fluid under pressure can be directed thereinto to inflate the same. A valve 96 coupled to conduit 94 controls the fluid flow therethrough. Valve 96 is preferably of a 3-way type so that device 66 can be exhausted and thereby deflated as desired. To this end, valve 96 may have a discharge orifice to limit the rate of deflation of device 66.

To augment the sealing action of seal 58, ring 62 is provided with an annular groove 98 in surface 64 thereof and a bore 100 communicating with groove 98 and extending to the outermost end face 102 of ring 62. A flexible tube 104 is disposed in bore 100 and is received within aligned bores 106 and 108 through ring 90 and end plate 20 respectively. A fitting 110 is threadably coupled to end plate 20 in alignment with tube 104. Fitting 110 may be coupled to either a source of fluid under positive pressure or to a vacuum source. If connected to the former, the pressurized fluid directed through tube 104 into groove 98 will counter any leakage of fluid tending to pass through the junction between bearing member 44 and ring 62. Such leakage may arise either by "wicking" due to the porosity of the filter material or to the actual seepage of fluid between the filter material and the adjacent structural components.

If fitting 110 is coupled to a vacuum source, the leakage fluid will be drawn into groove 98 and through tube 104 to a collection area or, in the alternative, could return to conduit 36 for refiltering.

A porous backing member 112 mounted within housing 12 surrounds portion 28 to provide support therefor as it tends to expand under fluid pressure. Member 112 includes a plurality of spaced rods 114 extending longitudinally of housing 12 and interconnected by spaced rings 116. The end rings 116 are secured by connecting structures 118 to the inner surface of housing 12 as shown in FIGS. 2 and 3.

Filter medium 30 is initially wound on a roll 120 carried by bracket structure 122 mounted on supporting surface 32. The filter medium extends outwardly from roll 120 and passes about guide rollers 124 and into housing 12. The tubular configuration will have been provided for filter medium 30 before it is wound on roll 120. This can be done, for instance, by interconnecting the opposed side edges of a sheet of filter material in any suitable manner.

The filter medium extends outwardly of housing 12 through apertures 26 and is engaged by a rotary cutter 126 secured to an arm 128 carried by conduit 36. Cutter 126 severs the side wall of the filter medium to provide an opening through which conduit 36 may extend. Other means may be provided to form this wall-opening operation, if desired.

Take-up means 130 including a pair of rollers 132 and actuatable power means 133 coupled thereto is mounted on surface 32 for selectively moving the filter medium through housing 12. A control can be provided to actuate power means 133 in timed relationship to the deflation of devices 66. A receptacle 134 aligned with take-up means 130 receives the used filter medium as it moves away from housing 12.

In operation, roll 120 is unwound initially to a certain extent so that the filter medium extends through housing 12, past cutter 126 and into coupled relationship with take-up means 130. Conduits 36 and 41 will have been connected to a fluid flow system so that the path of fluid flow will be through housing 12 by means of section 38, portion 28, and conduit 41. Valve 96 will have been coupled to a source of fluid, such as air, under positive pressure.

As the filter medium is directed into housing 12, it will engage and be opened by dome-shaped end 54. It will retain its tubular configuration by engaging adjacent annular surfaces of bearing members 42 and 44.

After the filter medium is in place, valve 96 is opened so that devices 66 are inflated. This will cause rings 60 and 62 to move toward each other and thereby force the adjacent annular segments of portion 28 against bearing surfaces 46 and 48 respectively. Fitting 110 will also be coupled to a suitable fluid mechanism, such as a source of fluid under pressure or to a vacuum source. The purpose of this has been described above.

When fluid flow through conduit 36 is initiated, the fluid will flow into portion 28 under pressure and will fill the interior thereof. The fluid will then pass through the filter material and into the space surrounding the same, from whence it will flow into and through conduit 41. The fluid pressure exerted on the inner surface of portion 28 will be countered by backing member 112 and, by virtue of the substantially cylindrical configuration of both portion 28 and member 112, the fluid pressure will be uniform throughout substantially the entire effective surface area of portion 28.

To replace the filter medium, members 66 are deflated by exhausting the same to the atmosphere. Valve 96 effects this action. Springs 76 then retract rings 60 and 62 to their positions as shown in FIG. 4 whereupon take-up means 130 is actuated to pull the used portion 28 out of housing 12. As this occurs, cutter 126 severs the side wall of the filter medium and the latter is collected in receptacle 134. Also, roll 120 unwinds and the succeeding portion 28 moves into place within housing 12.

After the replacement portion 28 is in place, valve 96 is again actuated to inflate members 66. This seals the extremities of the new portion 28 and the flow of fluid through conduit 36 can once again commence.

Any leakage of the fluid through the junctions defined by bearing members 42 and 44 and rings 60 and 62 is countered by the auxiliary sealing means provided by grooves 98 in rings 60 and 62 respectively regardless whether a fluid pressure source or a vacuum source is used. Thus, apparatus 10 assures that substantially all fluid passing therethrough will be filtered. Since the fluid inlet defined by section 38 is interiorly of stretch 28, the impurities removed by the filtering action will be trapped within stretch 28. These impurities are completely removed from housing 12 when stretch 28 is replaced inasmuch as the bevel of surface 48 and the distance between bearing member 44 and ring 62 are such that stretch 28 makes no substantial contact with either of these components. This feature is illustrated in FIG. 4 wherein ring 62 is separated from bearing member 44 to allow replacement of the filter stretch. Surface 64, which seals the corresponding extremity of stretch 28, remains clean at all times and O-rings 50 effectively cooperate to sealingly engage the inner surface of stretch 28.

Apparatus 10 provides a filter unit which can be used to filter fluids subjected to relatively high pressures. In addition, apparatus 10, with the cylindrical configuration for housing 12, is capable of meeting the high pressure certification requirements for pressure vessels established by governmental codes.

While one embodiment of this invention has been shown and described, it will be apparent that other adaptations and modifications can be made without departing from the true spirit and scope of the invention.

What is claimed is:

1. Filter apparatus comprising: a housing having an open end; a tubular filter member having a pair of open extremities and being disposed in a fixed position within the housing and movable outwardly thereof through said open end; a fluid inlet conduit and a fluid outlet conduit coupled with said housing, one of said conduits extending into said housing through said open end and into said filter member through one extremity thereof, said one conduit being disposed in fluid communication with the interior of said filter member and the other conduit being disposed in fluid communication with the housing exteriorly of said filter member; and means coupled with the housing and said one conduit for removably closing the open extremities of the filter member an said open end of the housing whereby the filter member will be disposed across a fluid flow path defined by said conduits.

2. Filter apparatus as set forth in claim 1, wherein said filter member is flexible, and wherein is included a porous backing member within said housing on the outlet side of the filter member to support the latter as fluid passes therethrough.

3. Filter apparatus as set forth in claim 1, wherein said closing means includes inflatable structure engageable with the filter member in sealing relationship to each extremity thereof respectively.

4. Filter apparatus as set forth in claim 1, wherein said closing means includes a bearing member on said one conduit adjacent to each extremity of the filter member respectively, and inflatable structure carried by the housing at each end thereof respectively, said structure being movable into and out of a location forcing the corresponding extremity of the filter medium against the adjacent bearing member to thereby close the extremity.

5. Filter apparatus comprising: a cylindrical housing having a pair of open ends; an elongated, flexible tubular filter member adjacent to one end of the housing, said filter member being movable relative to the housing to permit successive portions of the filter member to move into, through and out of the housing through said open ends, said filter member normally extending through the housing whereby a portion of the filter member is disposed within the housing; a first conduit coupled to said housing and in fluid communication therewith exteriorly of said portion; a second conduit extending through the opposite open end of the housing and into said portion through the proximal extremity thereof, said second conduit being in fluid communication with the interior of said portion and being provided with a pair of spaced bearing surfaces adjacent to respective extremities of said portion; and means carried by the ends of the housing and movable into substantial engagement with the opposed extremities of said portion to force said extremities against the bearing surfaces and for closing said open ends to confine the fluid flowing through the housing to the path defined by said conduits.

6. Filter apparatus as set forth in claim 5, wherein the inner conduit defines a fluid inlet for the housing, and wherein is provided a porous backing member surrounding the filter medium to support the same against expansion beyond its normal transverse dimension.

7. Filter apparatus as set forth in claim 5, wherein said filter member is formed from a material capable of being opened, and wherein is included means adjacent to and externally of said opposite open end for opening the filter member, said second conduit extending through the opening made by said opening means, and wherein is included take-up means adjacent to the opening means to advance successive portions of the filter member through the housing when said forcing means is out of substantial engagement with said portion.

8. Filter apparatus as set forth in claim 5 wherein the bearing surface adjacent to said opposite end of the housing is annular and beveled, said forcing means includes a rigid ring adjacent to said opposite end for engaging the corresponding extremity of said filter member, said ring having a surface substantially complemental to said beveled bearing surface and being movable through a predetermined distance away from said beveled bearing surface, the bevel of said bearing surface and said distance being sufficient to permit said portion of the filter member to pass out of said housing through said opposite end without substantially engaging said beveled surface and said ring when the latter has been moved away from said beveled bearing surface.

9. Filter apparatus as set forth in claim 5, wherein said forcing means includes an inflatable member for each end of the housing respectively, each inflatable member having a continuous surface engageable with the corresponding extremity of said portion and provided with fluid actuated means for interrupting the fluid leakage between said continuous surface and the corresponding bearing surface.

10. Filter apparatus as set forth in claim 5, wherein said forcing means includes an inflatable member for each end of the housing respectively, and means biasing each member in a direction away from the corresponding bearing surface, whereby the inflatable member, when deflated, will clear the filter medium and allow the latter to shift relative to the housing.

11. Filter apparatus comprising: a housing having a pair of spaced, open ends; a pair of end plates secured to respective ends of the housing, each end plate having an opening therethrough; a roll of a tubular filter member formed of a flexible severable material; means mounting said roll for rotation adjacent to one of the end plates to permit successive portions of the filter member to be unwound from the roll and to move relative to and through said housing, said filter member normally extending away from the roll and through the housing whereby a portion of the filter member is within the housing; take-up means adjacent to the opposite end plate and coupled with said filter member to advance the same through the housing; means between said take-up means and the opposite end plate for severing the side wall of the filter member; a first conduit adjacent to said severing means and extending into the filter member through the severed area thereof, said first conduit being in fluid communication with the interior of the portion of the filter member within the housing to provide a fluid inlet therefor; a pair of spaced bearing members secured to said first conduit within the housing and having respective annular bearing surfaces disposed adjacent to respective end plates; a ring for each end plate respectively; an inflatable device mounting each ring respectively on the corresponding end plate for movement toward and away from a location adjacent to the corresponding bearing member, said rings being disposed for forcing respective annular segments of said portion against the corresponding bearing surfaces and said devices being disposed to bridge the space between said rings and respective end plates when said rings are in said locations, whereby the extremities of said portion and the openings of said end plates are closed; means biasing the rings away from said locations to allow said filter member to be moved relative to the housing by said take-up means when said devices are deflated; a porous backing member disposed within the housing in surrounding relationship to said portion to support the same against expansion as fluid is directed thereinto from said first conduit; and control means coupled with said devices for selectively inflating and deflating the same.

12. Filter apparatus comprising: a housing having a pair of open ends; a tubular filter member movable into the housing through one end thereof, into a fixed position therewithin, and out of the housing through the opposite end thereof; a fluid inlet conduit and a fluid outlet conduit coupled with said housing, one of said conduits extending into said housing through a first open end thereof and into said filter member through one extermity of the same, said one conduit being disposed in fluid communication with the interior of said filter member and the other conduit being disposed in fluid communication with the housing exteriorly of said filter member; and means coupled with the housing and said one conduit for closing the opposed extermities of the filter member and said open ends of the housing, whereby the filter member will be disposed across a fluid flaw path defined by said conduits.

References Cited

UNITED STATES PATENTS

| | | | |
|---|---|---|---|
| 1,331,732 | 2/1920 | Wait | 210—445 |
| 2,302,622 | 11/1942 | Manning | 210—387 X |
| 2,369,740 | 2/1945 | Johnson, et al. | 210—435 |
| 2,675,129 | 4/1954 | Doubleday | 210—387 X |
| 2,691,446 | 10/1954 | Murray | 210—387 X |
| 3,276,594 | 10/1966 | Gwilliam | 210—350 |
| 3,066,801 | 12/1962 | Lundeen | 210—98 |

FOREIGN PATENTS 204,159 11/1956 Australia.

REUBEN FRIEDMAN, *Primary Examiner.*

J. ADEE, *Assistant Examiner.*